United States Patent Office 3,129,262
Patented Apr. 14, 1964

3,129,262
REDUCTION OF ORGANIC THIOCYANATES
Robert J. Laufer, Pittsburgh, Pa., assignor to Consolidation Coal Company, Pittsburgh, Pa., a corporation of Pennsylvania
No Drawing. Filed Oct. 8, 1962, Ser. No. 229,213
12 Claims. (Cl. 260—573)

This invention relates to an improved process for converting organic thiocyanates to thiols. More particularly, it relates to the preparation of mercaptophenols by the reductive cleavage of thiocyanophenols using alkali metal and anhydrous liquid ammonia.

The conversion of organic thiocyanates to mercaptans, i.e., thiols, by chemical reduction using metal-acid combinations or by catalytic hydrogenation is known. Chemical reductions carried out with, e.g., zinc and hydrochloric acid, proceed very slowly; catalytic hydrogenation using hydrogen in the presence of molybdenum disulfide as catalyst gives poor yields. Such a technique when applied to a thiocyanophenol results in substantial cleavage of the entire thiocyano group from the ring, thereby obtaining the phenol as one of the principal products, with but slight yield, if any, of the desired mercapto-substituted phenol. Another reduction method using lithium aluminum hydride in ether is of general utility. However, this method is not suitable for commercial exploitation because of the high cost of the lithium aluminum hydride, which is consumed. Thus none of the foregoing methods combine the desired properties of being of broad general application, of providing high yields of the converted thiol, and of being relatively inexpensive.

Various methods have also been proposed for the preparation of mercaptophenols, which are phenolic compounds substituted in the aromatic nucleus with a mercapto group in addition to the hydroxyl group. These compounds and their S-alkyl derivatives, i.e., alkyl mercaptophenyl sulfides, are suitable for therapeutic use as antiseptics. They are also important as direct intermediates in the synthesis of various alkylmercaptophenyl phosphoric acid ester amines used as contact insecticides and as systemic agents. One such synthesis is shown in U.S. Patent 2,978,479.

In one method for the preparation of a mercaptophenol, shown in U.S. Patent 2,810,765, a phenol is sulfurized by reaction with sulfur monochloride, and the polysulfide product formed is hydrogenated to yield the desired mercaptophenol. This method is disadvantageous in that, where an alkyl phenol is sulfurized, the alkyl group, e.g., t-alkyl, is migratory, assuming a more stable configuration under acid catalysis. Thereby mixtures of mercaptophenols are obtained comprising the expected product and an isomer in which the t-alkyl phenol has isomerized prior to its sulfurization. Thus, a sample of 4-mercapto-6-t-butyl-o-cresol prepared from 6-t-butyl-o-cresol via sulfurization-hydrogenation will contain appreciable quantities of 6-mercapto-4-t-butyl-o-cresol. It is well known that 6-t-butyl-o-cresol is readily isomerized to 4-t-butyl-o-cresol. Further, the sulfurization route is variable, and low yields of mercaptophenols are obtained because of thiobisphenol formation. In another method, where mercaptophenols are prepared from aminophenols via the Leuckart synthesis, the process is too elaborate and costly for commercial use and requires as starting materials the more expensive aminophenols.

In a method shown in U.S. Patent 2,923,743, the phenol is reacted with a dialkyl disulfide in the presence of an acidic condensation agent to yield the S-alkyl derivative of a mercaptophenol. Syntheses using the Bayer process, e.g., reaction of dialkyl disulfides with an acid catalyst, also yield alkyl mercapto derivatives of phenols rather than mercaptophenols.

The present invention provides an improved method for converting organic thiocyanates to thiols, and is particularly suitable for converting thiocyanophenols to mercaptophenols. In accordance with the process of this invention, organic thiocyanates may be converted to thiols by reacting the organic thiocyanate with alkali metal-anhydrous liquid ammonia reagent, i.e., a solution consisting of alkali metal as solute dissolved in anhydrous liquid ammonia as solvent. The thiocyanate is dissolved in anhydrous liquid ammonia and then reacted with alkali metal, preferably sodium, to form the alkali salt of the organic mercaptan as well as alkali cyanide. Acidification then frees the mercaptan and hydrogen cyanide from their alkali salts. This selective cleavage technique is generally applicable to all organic thiocyanates. Where certain reactive groups are present which would be affected by the sodium-ammonia reagent, such as halogen or nitro groups, these groups will also be removed or reduced. Also, certain polycyclic aromatic nuclei may be partially hydrogenated by the use of sodium-ammonia reagent, as is known. For convenience, the alkali metal used has been exemplified throughout as sodium since this would be preferred for commercial use because of its lower cost and availability. However, potassium and lithium would be as effective technically, as also would be the liquid sodium-potassium alloy. Thus, from a technical standpoint, an alkali metal selected from the group consisting of lithium, sodium, potassium, and alloys thereof, may be readily employed in practicing this invention.

The process of this invention is particularly applicable and preferred for the conversion of thiocyanophenols to mercaptophenols in high yield under commercially feasible conditions. Inasmuch as phenols may now be readily converted to thiocyanophenols by the process shown in the copending application of E. P. Previc, S.N. 228,870, filed of even date herewith, the present process further provides a means for producing mercaptophenols from phenols which is readily adaptable to commercial exploitation, and whereby the intermediate thiocyanophenol may be reacted as a crude product in situ without further purification. Such an in situ technique is particularly useful inasmuch as many thiocyanophenols tend to polymerize on storage or even during their synthesis. The process of the present invention will give excellent results even with considerably deteriorated thiocyanophenols.

The present process is particularly advantageous over previously employed procedures for preparing mercaptophenols, particularly p-mercaptophenols in that it is adaptable to semi-continuous operation and to commercial development at relatively low cost. In practicing the process of this invention in its preferred aspects, no undesired by-products are obtained. Furthermore, only a single isomer is obtained in each instance, no isomerization occurring resulting in mixtures of products, such as occurs in the sulfurization process shown in U.S. 2,810,765. As mentioned, in the sulfurization process, the t-alkyl group is mobile and migrates to form a more stable configuration.

By use of the present process, a mercaptophenol may be prepared from a phenol in high yield and purity without isolation of the intermediate thiocyanophenol. Thus as taught in the copending application of E. P. Previc, S.N. 228,870, filed of even date, a phenol is reacted with thiocyanogen (either free thiocyanogen or prepared as nascent thiocyanogen by reaction of an inorganic thiocyanate with a halogen) whereby the corresponding thiocyanophenol and thiocyanic acid are formed. The so-formed thiocyanic acid is neutralized by reacting it with ammonia to form ammonium thiocyanate. Then in combination with the present process, the crude thiocyanophenol is reacted with the alkali metal-liquid ammonia solution whereby the thiocyanophenol is reductively cleaved to form the corresponding mercaptophenol. This combination process is uniquely adapted for the conversion of a phenol to a corresponding mercaptophenol without isolation and elaborate purification of interemdiate products. It is particularly of utility for the preparation of p-mercaptophenol inasmuch as the thiocyanation of phenols having an unsubstituted para position proceeds more rapidly than the thiocyanation of p-alkyl phenols.

The complex procedures heretofore known for the reductive cleavage of organic thiocyanates or for converting phenols to mercaptophenols are not feasible for commercial development because of either their low yield or their prohibitive cost. The instant process brings mercaptophenols into the realm of low cost commercial chemicals. Such chemicals are of particular interest because of their serving as direct intermediates for the formation of many important thiophosphoric acid esters which are useful as insecticides, acaricides, mitricides, ovicides, etc., for example as shown in U.S. Patent 2,978,-479. The mercaptophenol compound 4-methylmercapto-m-cresol is a particularly important intermediate for these syntheses.

Somewhat surprisingly, the sodium-ammonia reagent effects a selective cleavage of the thiocyanophenol. Thiocyano groups are considered chemically to behave as pseudo-halogens, and resemble iodine in many of their chemical properties. Sodium-ammonia reagent, which ordinarily cleaves a nuclearly attached chlorine or iodine group from the ring, when used in the present process does not effect a cleavage of the thiocyano group from the ring, as would be expected. Instead, the cleavage occurs between the sulfur atom and the non-nuclearly attached carbon atom, to yield the ring-attached mercapto group. It is this unexpected selective cleavage behavior of the sodium-ammonia reagent which makes the process of the present invention of commercial utility.

The process of this invention is applicable to the reduction of both aliphatic and aromatic organic thiocyanates. The aliphatic organic thiocyanates may be readily prepared by a metathetic interchange between an alkyl halide and an inorganic thiocyanate salt. For example, n-butyl thiocyanate is prepared by the reaction between n-butyl bromide and ammonium thiocyanate. Other methods are well known in the art. Exemplary aliphatic mercaptans that may be prepared by the process of this invention include the alkyl, alkenyl, and alkynyl mercaptans. Preferred starting alkyl thiocyanates are the $C_1$ to $C_{12}$ compounds which are readily cleaved to form the corresponding mercaptans. Both monomercaptans and dimercaptans may be formed. Thus the reaction of allyl chloride with ammonium thiocyanate will yield the mono-substituted thiocyanate. However, the addition product of butadiene and thiocyanogen yields the disubstituted thiocyanate which is readily reduced to form the di-mercaptan. Similarly, cyclohexyl bromide is readily converted to the monothiocyanate salt, whereas cyclohexene forms the dithiocyanate.

Exemplary of aromatic mercaptans that may be prepared by the reduction of corresponding aromatic thiocyanates are the thiophenols and benzyl mercaptans prepared by reduction of phenyl and benzyl thiocyanates, respectively; the mercaptophenols prepared by reduction of phenolic thiocyanates. This method is also generally applicable to the synthesis of aminothiophenols, N-alkyl-aminothoiophenols, and N,N-dialkylaminothiophenols.

Eessentially of a stoichiometric quantity of alkali metal is required for the reduction reaction. In a typical conversion of a thiocyanophenol to a mercaptophenol, one mole of sodium is consumed in converting the phenolic hydroxyl group to the sodium phenate salt. Two additional moles of sodium are required for the reductive cleavage, one mole ending as sodium cyanide, the other as the sodium mercaptide.

The reduction of thiocyanophenols is preferably carried out on a commercial scale in stainless steel equipment. When stainless steel equipment is used, no evidence of sodamide formation is noted. This undesirable side reaction can occur in non-stainless steel apparatus because of the known catalytic effect of iron, cobalt, and nickel ions.

The thiocyanate is dissolved in sufficient liquid ammonia, and sodium is added in small pieces. Alternatively, the sodium may be metered as a liquid by first dissolving it in liquid ammonia and adding this solution to the reaction vessel; or the sodium may be added as the molten metal; or the low-melting liquid sodium-potassium alloy may be used. Liquid ammonia is the solvent of the system, and is ordinarily used at or below its boiling point of −33° C. In order to avoid undue losses of product caused by heat generation during the reaction, preferable operation is at temperatures about 5 degrees below −33°, to approximately −40° C. Removal of the heat of reaction through the walls of the reactor is preferred to cooling by reflux to avoid frothing of the reaction mixture.

While the reductive cleavage may be conducted at temperatures up to 100° C. using pressurized equipment, there is ordinarily no advantage obtained in operating at these higher temperatures. Operating at a superatmospheric autogenous pressure would provide an increased hazard attendant with the handling of sodium or sodium-containing solutions under pressure.

Optimum results are dependent on the use of an adequate proportion of ammonia, which functions as a solvent for both the initial thiocyanate reactant and the resulting products. The minimum amount of ammonia required varies depending on the particular thiocyanate undergoing reaction, and may be readily determined experimentally. Ammonia requirements vary from 2 to 100 parts by weight of ammonia per weight of thiocyanate. An inadequate amount of ammonia gives rise to a low conversion of thiocyanophenol and a generally sluggish reaction. Experimentally, this is readily noted by the presence of undissolved sodium metal or a substantial quantity of a copper-bronze-colored solution phase in the reaction mixture. Increasing the volume of ammonia eliminates these effects. Efficient agitation is also desirable, particularly in those cases in which a heavy precipitate of sodium salts forms. Ordinarily, sodium is added until a permanent blue color (approximately one-half to three hours duration) results. The observed end point corresponds very closely to the theoretical one.

Any excess sodium is conveniently destroyed by the addition of methanol. Ammonia is then distilled from the reactor until the residual salt cake has been warmed to room temperature. The stirrer is raised during the evaporation of ammonia to prevent its becoming immobilized in the salt which is deposited. The sodium salts are then dissolved in water and neutralized by the addition of mineral acid. The liberated mercaptan is then dissolved in a solvent, washed free of inorganic matter, and distilled.

The following examples illustrate this invention but are not intended as limitations thereof.

EXAMPLE 1

*Preparation of n-Butyl Mercaptan*

(a) *Synthesis of n-butyl thiocyanate.*—A 1-liter flask with reflux condenser was charged with 115 g. NH₄SCN and 340 ml. 95% denatured ethanol. The mixture was brought to reflux, and 137 g. of n-butyl bromide was added dropwise over a period of 22 minutes.

Refluxing was continued for 2 hours; then 210 ml. of solvent was removed on the steam bath by distillation. The residue was cooled, and 250 ml. of water was added to dissolve the salts. Following further purification, n-butyl thiocyanate was recovered in 99.4% purity (gas chromatography). The n-butyl thiocyanate was recovered as a water-white liquid having a characteristic sweetish odor. Its boiling point was 185–6° C.

(b) *Reduction of n-butyl thiocyanate to n-butyl mercaptan.*—A 1-liter, 3-necked flask equipped with stirrer, Dry Ice condenser, drying tube, and thermometer, and cooled in a Dry Ice-acetone bath, was charged with ca. 250–300 ml. liquid $NH_3$ (−33°). To it, 58 g. (0.5 mole) of n-butyl thiocyanate was added to form a clear solution. Sodium metal (22.8 g. total) was added in small pieces over a period of 2½ hours until a permanent blue color was obtained. Initially, the reaction was very rapid. One hour after the last amount of sodium was added, 2 ml. of methanol was used to discharge the color, and ammonia was then removed by distillation. The residual salt cake was taken up in water. The solution was acidified with 6 N aqueous HCl (cooling). The oil and hexane extract of the aqueous phase were combined, washed thoroughly with brine, and dried over $MgSO_4$.

The product was distilled, and n-butyl mercaptan was recovered (35.9 g.). The yield on the basis of charged thiocyanate was 79% of theory. The non-distillable residue was probably disulfide and would account for 11% of the product. The amount of sodium consumed was virtually theoretical (one gram atom). The product identity was confirmed by converting a portion of it to its 2,4-dinitrophenyl sulfide.

EXAMPLE 2

*Reduction of Benzyl Thiocyanate to Benzyl Mercaptan*

A 500-ml. flask equipped with stirrer, Dry Ice condenser, thermometer, and drying tube, was charged with ca. 250 ml. of liquid ammonia (−33°). Benzyl thiocyanate (50 g.) was slurried in the ammonia, and 17.5 g. of sodium was added in small pieces over a period of 94 minutes to yield a pale violet color. The reaction mixture was a slurry throughout. The sodium reacted very rapidly.

After an additional 75 minutes, 3 ml. of methanol was added. A color change indicated that excess sodium had been present. The ammonia was evaporated to 30°. The salt cake was dissolved in 200 ml. of water. An oil phase which separated and an ether extract of the caustic aqueous phase were combined, washed free of base with brine and dried over $MgSO_4$. Toluene (9.7 g.) and a non-distillable sulfur-containing residue were obtained from this combined phase.

Following acidification of the caustic aqueous phase and further purification and distillation, 5.1 g. of a caustic-soluble distillate having a boiling point of 87° C. at 20 mm. was obtained. This was shown to be pure benzyl mercaptan by infrared spectroscopy.

EXAMPLE 3

*Preparation of p-Aminothiophenol From p-Thiocyanoaniline*

To 100 ml. of liquid $NH_3$ was added 7.2 g. of p-thiocyanoaniline in a 300-ml. 3-neck flask equipped with a Dry Ice condenser and stirrer. Over a period of ½ hour, 2.2 g. of sodium was added. After the addition of the sodium, the mixture was allowed to reflux for ½ hour.

The mixture was then freed of $NH_3$ by slow warming. The caked solid mixture was then dissolved in 100 ml. of water. The thiol was sprung from the solution by the addition of 25 ml. of concentrated acetic acid. The organic phase was extracted with 50 ml. of ether and washed and dried. Distillation under reduced pressure yielded 4 grams of p-aminothiophenol.

EXAMPLE 4

*Synthesis of p-(N,N-Dimethylamino)Thiophenol*

A reaction flask fitted with a stirrer, Dry Ice condenser, and drying tube, was charged with ca. 500 ml. of ammonia (−33° C.). Then 75 g. of purified p-thiocyano-N,N-dimethylaniline, prepared according to the procedure shown in Organic Reactions, vol. III, p. 256, was added. The thiocyano compound was dissolved in the ammonia at −50°. Sodium metal was then added in small pieces until the blue color obtained persisted for 30 minutes (1¼ hr.). (20.2 g. Na required, 19.3 g. theoretical for 2 g. atoms per mole). Then approximately 2 ml. of methanol was added to discharge the color. The ammonia was distilled to a pot temperature of 50°. The residual white cake was dissolved in 200 ml. of water, cooled to 10°, and neutralized to pH 7 with aqueous 6 N HCl (25°). The product separated as a crystal slurry. The latter was taken up in ether. The ethereal phase was washed with brine and dried over $MgSO_4$.

The ether was removed and the product was distilled at reduced pressure to obtain the desired product. The yield of p-(N,N-dimethylamino)thiophenol was 46 g. or 71.5% of theory.

EXAMPLE 5

*4-Mercaptophenol From 4-Thiocyanophenol*

A crude mixture (1032 g.) containing 4-thiocyanophenol (6.4 moles) and phenol (0.5 mole) was dissolved in 5 liters of ammonia at −36° C.; then 442.5 g. (19.2 moles) sodium (theoretical sodium=20.5 moles) was added over a period of 4 hours at −50° C. until a blue coloration developed which persisted for one hour. After one hour the blue coloration disappeared and no additional sodium was added. The ammonia was allowed to evaporate overnight at ambient temperature. Then the sodium salt of the product was dissolved in two liters water, acidified with 3 liters concentrated HCl, and extracted twice with ether. The ether extract was washed with brine until only slightly acidic, then distilled at reduced pressure to yield 646 grams of 4-mercaptophenol (80% of theory). Product identity was confirmed by infrared spectroscopy.

EXAMPLE 6

*4-Mercapto-m-Cresol From 4-Thiocyano-m-Cresol*

Crude 4-thiocyano-m-cresol (740 g.; 4.24 moles) prepared from 458 g. of m-cresol was obtained as a viscous, oily liquid which was allowed to crystallize. To this crystalline material was added about 1½ liters of liquid ammonia. Then, over a 6½ hour period at a reaction temperature of −37° to −50° C., 300.5 g. of sodium (13.1 moles; theoretical=12.7 moles) was added in about 6–8 g. lumps, allowing each lump to be consumed before adding the succeeding one, until a persistent blue color was obtained. About 50 ml. of methanol was used to wash the walls of the flask. Then the mixture was allowed to warm, and the ammonia was evaporated. The recovered solid material was dissolved with 1500 ml. water, and 2 liters of 6 N HCl was added slowly with stirring at 5–15° C. The product separated as a heavy, dark oil. During the acidification, effluent HCN was removed by water-scrubbing of the exit gases. The aqueous layer was decanted from the oily product and extracted twice with ether. The oily product was combined with the ether extracts and washed with brine until neutral. The ether solution was then dried and distilled at reduced pressure to yield 483 grams of 4-mercapto-m-cresol and 12 grams of m-cresol. Based on m-cresol originally charged, 97% over-all conversion of m-cresol to 4-mercapto-m-cresol was obtained. The yield of 4-mercapto-m-cresol based on converted product was 83.5%.

EXAMPLE 7

*4-Mercapto-o-Cresol From 4-Thiocyano-o-Cresol*

Orthocresol (1081 g.) was reacted to form 4-thiocyano-o-cresol, and the crude product was dissolved in 6 liters of ammonia cooled to −60° C. A total of 700.3 g. of sodium was then added over a seven-hour period before a "persistent" blue color remained in the mixture. The ammonia was allowed to evaporate, and the product was acidified with HCl. The aqueous phase was decanted from the oily product and extracted with ether. The oily layer and the ether were combined and washed with brine until neutral. They were then dried over anhydrous magnesium sulfate and distilled at reduced pressure. An over-all conversion of 96% was obtained. The yield of 4-mercapto-o-cresol, based on o-cresol charged, was 87%; based on o-cresol converted, 90.5%.

EXAMPLE 8

2-Mercapto-p-Cresol From p-Cresol (a) *Thiocyanation of p-cresol.*—One mole (71 g.) of chlorine was added in 1½ hours at −15 to −5° C. to 108 g. (1.0 mole) of p-cresol and 155 g. (2.0 moles) ammonium thiocyanate dissolved in 250 ml. sulfur dioxide. Following reaction, the sulfur dioxide was removed, 200 ml. ether was added, and the solution was filtered. The filtrate was treated with ammonia, refiltered, water-washed, dried over magnesium sulfate, and distilled to remove ether. The crude residue was a cloudy viscous oil weighing 136.5 g., consisting of 2-thiocyano-p-cresol and containing unreacted p-cresol.

(b) *Hydrogenolysis of 2 - thiocyano-p-cresol.*—The crude thiocyanophenol residue 49.5 g. (0.3 mole, est.) and 250 ml. of liquid ammonia were charged to a reaction vessel, and 20.7 g. sodium (0.9 mole) was added incrementally at −40° C. In 3½ hours, after addition of only 15.2 g. (0.66 mole) of sodium, a permanent blue color developed. After one hour, a few milliliters of methanol was added to consume excess sodium, the ammonia was distilled off, and 300 ml. of 6 N acid was added. The product was extracted with successive portions of ether, and the ethereal solution was dried and distilled. The conversion of p-cresol to 2-thiocyano-p-cresol was 67.5%; yield of 2-thiocyano-p-cresol, 91%; yield of 2-mercapto-p-cresol from crude 2-thiocyano-p-cresol, 37%.

EXAMPLE 9

Synthesis of 4-Mercapto-6-t-Butyl-o-Cresol

A 5-liter flask was charged with 419.3 g. of 4-thiocyano-6-t-butyl-o-cresol and ca. 2 liters of ammonia. The reaction temperature was kept at −35° by Dry Ice-acetone cooling, and 132 g. of sodium was added over a period of 77 minutes. Initially, the reaction mixture was a light slurry, easily stirred, which eventually became a light-yellow clear solution. Toward the end of the reaction, salts began to precipitate; then a deep blue color appeared which remained after ½ hour. Five milliliters of methanol was added to discharge the color, and the ammonia was evaporated. The residual salts were taken up in a liter of water, and the solution was acidified with a total of 1775 ml. of concentrated aqueous HCl added dropwise with stirring and cooling (16–40° C.) The oil which separated was taken up in ether, and the solution was washed with brine and dried over MgSO₄. The ether was removed, and the product was distilled on a Vigreux column at reduced pressure. The 4-mercapto-6-t-butyl-o-cresol was recovered in 88% yield.

EXAMPLE 10

Hydrogenolysis of 6-Thiocyano-4-t-Butyl-o-Cresol

Crude 6-thiocyano-4-t-butyl-o-cresol (16.7 g.; 0.0755 mole, est.) obtained as an amber, glassy material from the thiocyanation of 4-t-butyl-o-cresol, was cooled to −30° C. and broken into small particles, which were then slurried in 100 ml. of liquid ammonia. Over a two-hour period, 5.2 g. of sodium (0.226 mole) was added until a deep blue coloration persisted for one-half hour. A few milliliters of methanol was added to consume excess sodium, and the ammonia was then distilled off at atmospheric pressure. Dilute hydrochloric acid was added to free the mercaptophenol, which was extracted with ether, dried over magnesium sulfate, and distilled. The yield of 6-mercapto-4-t-butyl-o-cresol was 53%.

EXAMPLE 11

Reduction of 4-Thiocyano-2,6-Di-t-Butylphenol

Crude 4-thiocyano-2,6-di-t-butylphenol (325 g.) obtained from the thiocyanation of 2,6-di-t-butylphenol, in the form of a yellow powdered solid was charged to a 2-liter, 3-necked flask. Approximately 1-liter of liquid ammonia was added with stirring to form an easily stirred slurry. The starting material appeared to be fairly soluble in ammonia. Then 85.5 g. of sodium was added in ca. 2 g. pieces over a period of 2½ hours. The sodium reacted very rapidly throughout. The heat of reaction was removed through the flask by means of a Dry Ice-acetone bath (−40° C.), maintaining a reaction temperature of −35° maximum, rather than by use of reflux in order to avoid severe frothing. During the reaction, the initial slurry became a clear solution. The final piece of sodium added resulted in a persistent blue color. The ammonia was evaporated, water was added, and the solution was acidified and extracted with ether. The ethereal solution was distilled at reduced pressure. There were obtained 255 g. of 4-mercapto-2,6-di-t-butylphenol and 10 g. of unreacted 2,6-di-t-butylphenol. The over-all conversion was 96%. Yield of 4-mercapto-2,6-di-t-butylphenol based on converted material was 89%.

EXAMPLE 12

Preparation of 6-Mercapto-2,4-Di-t-Butylphenol (a) *Preparation of 6-thiocyano-2,4-di-t-butylphenol.*—Chlorine 35.5 g. (0.5 mole) was added in ½ hour to a mixture consisting of 103 g. (0.5 mole) 2,4-di-t-butylphenol, 78.3 g. (1.0 mole) ammonium thiocyanate, and 250 ml. sulfur dioxide at a temperature of −20° to −5° C. Following reaction, the sulfur dioxide was removed by distillation, and 300 ml. ether was added with stirring. The resulting slurry was filtered, and the ethereal filtrate was treated with anhydrous ammonia to precipitate the thiocyanic acid as ammonium thiocyanate. After refiltration, the clear amber filtrate was distilled to 100° C. at reduced pressure to remove ether. The residue, 6-thiocyano-2,4-di-t-butylphenol, obtained as a reddish glass, weighed 130 g. (theoretic yield, 131.5 g.).

(b) *Hydrogenolysis of 6-thiocyano-2,4-di-t-butylphenol.*—Sodium (17.3 g.; 0.75 mole) was dissolved in 250 ml. of liquid ammonia at −40° C. Crude 6-thiocyano-2,4-di-t-butylphenol (68.1 g.; 0.258 mole) was added incrementally over 4.5 hours until the blue color disappeared. The ammonia was distilled off, and 200 ml. of dilute hydrochloric acid was added to free the mercaptophenol. The resulting emulsion was extracted with two 200-ml. portions of toluene, and the extracts were water washed, dried over magnesium sulfate and distilled at reduced pressure. The 6-mercapto-2,4-di-t-butylphenol was obtained as a very light yellow viscous oil weighing 60 g. (theoretical 61.6 g.).

EXAMPLE 13

Hydrogenolysis of 6-Thiocyano-4-Octyl-o-Cresol

The crude 6-thiocyano-4-t-octyl-o-cresol (40 g.; 0.144 mole, est.) was obtained as an amber glass which dissolved with difficulty in 100 ml. ammonia; some ether was added to hasten solution. Sodium was added to the mixture at −35 to −45° C. in small increments until the deep blue color obtained persisted for nearly one hour. At this stage 6.8 g. (0.295 mole) of sodium had been added, or 68% of the stoichiometric amount of 0.432 mole. Methanol was added to consume excess sodium. Following distillation of the ammonia and acidification with dilute HCl, the mixture was ether extracted, and the dried ether solution was distilled. The estimated yield of 6-mercapto-4-octyl-o-cresol from 6-thiocyano-4-octyl-o-cresol was 79%.

EXAMPLE 14

Synthesis of 4-Mercapto-2-t-Butylphenol

A 2-liter flask (stirrer, thermometer, Dry Ice condenser, drying tube) was charged with 208 g. of crude 2-t-butyl-4-thiocyanophenol (obtained by thiocyanation of 2-t-butylphenol) and ca. 1000 ml. of liquid ammonia (−33°). A short period of stirring served to dissolve the thiocyanophenol. Sodium metal was then added in small pieces. After 47 minutes, 52.5 g. of sodium had been added and a light green solution resulted. The addition of more sodium caused a heavy slurry to form (white). An additional 500 ml. of ammonia was added to permit stirring to continue. After 66.2 g. of sodium had been added (2 hours total addition time), a blue color persisting for half an hour was obtained. Six milliliters of methanol was added to discharge the color, and ammonia was allowed to evaporate at room temperature.

The residual white salt cake was taken up in 500 ml. of water to form a cloudy solution. The latter was acidified by the dropwise addition of 900 ml. of 6 N aqueous HCl with stirring and external cooling to maintain the temperature near 20°.

The upper oil phase was combined with an ether extract of the aqueous phase. The ethereal solution was washed with brine until neutral and dried over $MgSO_4$. The ether was removed and the products were distilled at reduced pressure to yield 29 g. of unreacted 2-t-butylphenol and 127 g. of 4-mercapto-2-t-butylphenol, corresponding to an 80% yield of 4-mercapto-2-t-butylphenol based on converted 2-t-butylphenol.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. A process for converting an organic thiocyanate to a thiol which comprises reacting the organic thiocyanate with alkali metal-liquid ammonia solution to selectively cleave the carbon-sulfur bond of the thiocyanate to form the corresponding thiol.

2. The process according to claim 1 wherein said organic thiocyanate is an alkyl-substituted thiocyanate having from 1 to 12 carbon atoms in the alkyl group.

3. The process according to claim 1 wherein said organic thiocyanate is a thiocyanoaniline.

4. The process according to claim 1 wherein said alkali metal is sodium.

5. A process for the reductive cleavage of a thiocyanophenol to form the corresponding mercaptophenol which comprises reacting the thiocyanophenol with alkali metal-liquid ammonia solution to selectively cleave the thiocyanophenol to form a mercaptophenol, and recovering the mercaptophenol therefrom.

6. The process according to claim 5 wherein the thiocyano group is in the para position, and the p-thiocyanophenol contains at least one alkyl group in its ring.

7. The process according to claim 5 wherein 4-thiocyano-m-cresol is cleaved to form 4-mercapto-m-cresol.

8. The process according to claim 5 wherein 4-thiocyano-6-t-butyl-o-cresol is cleaved to form 4-mercapto-6-t-butyl-o-cresol.

9. The process according to claim 5 wherein 4-thiocyano-2,6-di-t-butylphenol is cleaved to form 4-mercapto-2,6-di-t-butylphenol.

10. The process according to claim 5 wherein said alkali metal is sodium.

11. A process for preparing a mercaptophenol by the reductive cleavage of a corresponding thiocyanophenol, which comprises first dissolving the thiocyanophenol in liquid ammonia, adding approximately 3 moles of sodium per mole of thiocyanophenol to said solution to selectively cleave the thiocyanophenol to form the corresponding mercaptophenol, and recovering the mercaptophenol from the solution.

12. The process according to claim 11 wherein the liquid ammonia solution is maintained at a temperature below −33° C. during the reductive cleavage reaction.

References Cited in the file of this patent

Krug et al.: J. Org. Chem. Chem., 20, 1–8 (1955), cited in Chem. Abstracts 50, 3391c (1956).

Reid: Org. Chem. of Bivalent Sulfur, vol. 1, page 37 (1960), Chemical Pub. Co., New York, N.Y.